United States Patent
Lai et al.

(10) Patent No.: US 12,539,490 B2
(45) Date of Patent: Feb. 3, 2026

(54) SYSTEM AND METHOD FOR REMOVING VOLATILE ORGANIC COMPOUNDS FROM PROCESS GASSES

(71) Applicant: Taiwan Semiconductor Manufacturing Co., Ltd., Hsinchu (TW)

(72) Inventors: Yen-Cheng Lai, Hsinchu (TW); Po-Yuan Chang, Hsinchu (TW); Ting Hsin Chang, Hsinchu (TW); Neng Chuan Chen, Hsinchu (TW); Hsiang I. Feng, Hsinchu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 1308 days.

(21) Appl. No.: 17/315,052

(22) Filed: May 7, 2021

(65) Prior Publication Data
US 2022/0355242 A1 Nov. 10, 2022

(51) Int. Cl.
*B01D 53/02* (2006.01)
*B01D 53/06* (2006.01)
*B01D 53/30* (2006.01)
*G06F 30/27* (2020.01)

(52) U.S. Cl.
CPC .......... *B01D 53/30* (2013.01); *B01D 53/06* (2013.01); *G06F 30/27* (2020.01); *B01D 2257/708* (2013.01); *B01D 2259/40009* (2013.01)

(58) Field of Classification Search
None
See application file for complete search history.

(56) References Cited

U.S. PATENT DOCUMENTS

2016/0008757 A1* 1/2016 Gromala ............... A61L 9/12
423/210
2019/0234631 A1* 8/2019 Wallace ............... B01L 1/04

FOREIGN PATENT DOCUMENTS

| CN | 101773763 A | 7/2010 |
| CN | 108854442 A | 11/2018 |
| CN | 110917808 A | 3/2020 |
| CN | 111103220 A | 5/2020 |
| CN | 111701444 A | 9/2020 |
| IN | 202011017649 A | 6/2020 |
| JP | H08309140 A | 11/1996 |
| JP | 4694650 B1 | 6/2011 |
| JP | 2012115721 A | 6/2012 |
| TW | 202107017 A | 2/2021 |
| WO | WO-2009036247 A1 * | 3/2009 ............ B01D 53/06 |

* cited by examiner

*Primary Examiner* — Paul S Hyun
(74) *Attorney, Agent, or Firm* — Seed IP Law Group (57) ABSTRACT

A VOC removal system removes VOCs from an exhaust fluid of a semiconductor process. The VOC removal system measures current VOC removal parameters and passes them to an analysis model trained with a machine learning process. The analysis model predicts a future VOC removal efficiency based on the current VOC removal parameters. The analysis model generates adjustment parameters based on the current VOC removal parameters and the predicted future VOC removal efficiency. A control system adjusts the VOC removal system based on the adjustment parameters.

20 Claims, 7 Drawing Sheets

SYSTEM AND METHOD FOR REMOVING VOLATILE ORGANIC COMPOUNDS FROM PROCESS GASSES

BACKGROUND

Technical Field

The present disclosure relates to the field of semiconductor process exhaust fluid purification.

Description of the Related Art

A large variety of semiconductor processes are utilized in fabricating integrated circuits. Such processes can include thin-film deposition processes, etching processes, annealing processes, lithography processes, and many other types of processes. Semiconductor processes often generate exhaust fluids. These exhaust fluids sometimes include high concentrations of volatile organic compounds (VOC). Volatile organic compounds are harmful if released into the atmosphere.

DETAILED DESCRIPTION

In the following description, many thicknesses and materials are described for various layers and structures within an integrated circuit die. Specific dimensions and materials are given by way of example for various embodiments. Those of skill in the art will recognize, in light of the present disclosure, that other dimensions and materials can be used in many cases without departing from the scope of the present disclosure.

The following disclosure provides many different embodiments, or examples, for implementing different features of the described subject matter. Specific examples of components and arrangements are described below to simplify the present description. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments of the present disclosure provide a VOC removal system that effectively removes VOCs from the semiconductor process exhaust fluids. Embodiments of the present disclosure utilize machine learning processes to periodically adjust the operation of the VOC removal system to maintain a high VOC removal efficiency. In particular, a machine learning model receives sensor data related to current operational parameters of the VOC removal system and data related to current VOC removal efficiency and identifies adjustments to be made to operational parameters in order to improve or maintain the VOC removal efficiency. This provides many benefits to the VOC removal system. In particular, dangerous VOCs are removed from exhaust fluids with a much higher efficiency than in traditional VOC removal systems. The result is cleaner emissions from semiconductor processing facilities. This results in improved environmental conditions.

Figure 1:
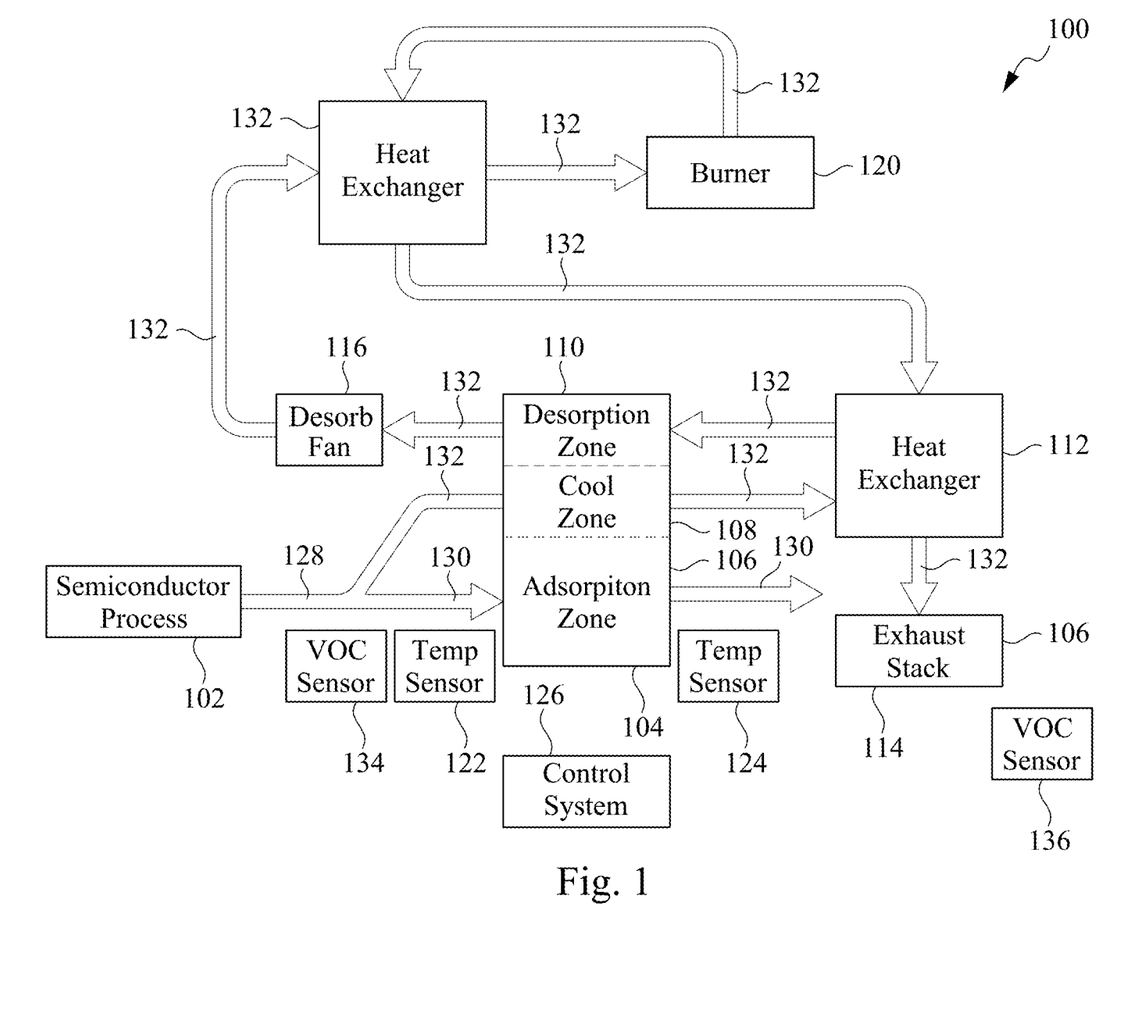
FIG. 1 is a block diagram of a VOC removal system, according to one embodiment.

FIG. 1 is a block diagram of a VOC removal system 100, according to one embodiment. The VOC system 100 includes a concentrator rotor 104. The concentrator rotor 104 includes an adsorption zone 106, a cooling zone 108, and a desorption zone 110. The VOC removal system 100 further includes a heat exchanger 112, exhaust stack 114, a desorption fan 116, a heat exchanger 118, an burner 120, temperature sensors 122 and 124, and a control system 126. As will be set forth in more detail below, the control system 126 utilizes machine learning processes to periodically adjust operational parameters of the VOC removal system 100 to improve or maintain VOC removal efficiency.

A semiconductor process 102 generates exhaust fluid 128. Examples of the semiconductor process 102 can include a thin-film deposition process, an etching process, a doping process, an annealing process, or other thin-film deposition processes. Furthermore, the scope of the present disclosure is not limited to exhaust fluids generated by semiconductor processes. Other processes such as thin-film transistor processes or other processes for forming thin-film electronic devices such as LCD screen devices and other types of devices can result in the exhaust fluid 128 including VOCs. The exhaust fluid 128 may include a high concentration of VOCs. It is beneficial to remove the VOCs from the exhaust fluid 128 before the exhaust fluid is released into the atmosphere. The VOC removal system 100 removes VOCs from the exhaust fluid 128.

The exhaust fluid 128 is passed to the VOC concentrator rotor 104. In one embodiment, the VOC concentrator rotor 104 has a shape of a large wheel with a diameter between 3 m and 5 m, though other diameters can be utilized without departing from the scope of the present disclosure.

The VOC concentrator rotor 104 includes an adsorption zone 106, a cooling zone 108, and a desorption zone 110. More properly, it may be stated that the VOC concentrator rotor 104 rotates through an adsorption zone 106, a cooling zone 108, and a desorption zone 110. This is because the VOC concentrator rotor 104 slowly rotates. The adsorption zone 106, the cooling zone 108, and the desorption zone 110 remain stationary. The VOC concentrator rotor 104 rotates through each of the zones. In particular, the VOC concentrator rotor 104 rotates from the adsorption zone 106 to the desorption zone 110, from the desorption zone 110 to the cooling zone 108, and from the cooling zone 108 back to the adsorption zone 106.

In one embodiment, the VOC concentrator rotor 104 includes a calcinated ceramic honeycomb substrate. The honeycomb substrate may include an inorganic binder. Aluminosilicate hydrate, also called zeolite, is embedded into the ceramic honeycomb substrate. The VOC concentrator rotor 104 with this structure and material is able to adsorb VOCs from the exhaust gas at low temperature and to desorb VOCs into the exhaust gas at high temperatures. Other materials and structures can be utilized for the VOC concentrator rotor 104 without departing from the scope of the present disclosure.

When the exhaust fluid 128 is passed from the semiconductor process 102 to the VOC concentrator rotor 104, a first portion 130 of the exhaust fluid 128 passes into the adsorption zone 106. A second portion 132 of the exhaust fluid 128 passes into the cooling zone 108 of the VOC concentrator rotor 104.

When the first portion 130 of the exhaust fluid 128 passes through the adsorption zone 106, VOCs are adsorbed onto the VOC concentrator rotor 104. The first portion 130 of the exhaust fluid 128 includes a high concentration of VOCs before passing through the adsorption zone 106 of the VOC concentrator rotor 104. After the first portion 130 of the exhaust fluid 128 passes from the adsorption zone 106 of the VOC concentrator rotor 104, the VOCs have been removed from the first portion 130 of the exhaust fluid 128. In particular, the VOCs from the first portion 130 of the exhaust fluid 128 are adsorbed onto that portion of the concentrator rotor 104 passing through the adsorption zone 106.

The first portion 130 of the exhaust fluid 128 passes from the VOC concentrator rotor 104 to the exhaust stack 114. The exhaust stack 114 passes the first portion 130 exhaust fluid 128 into the atmosphere. Because the VOC concentrator rotor 104 has adsorbed the VOCs from the first portion 130 of the exhaust fluid 128, the first portion of the exhaust fluid 128 is purified when it enters the atmosphere via the exhaust stack 114.

When the second portion 132 of the exhaust fluid 128 passes through the cooling zone 108, very little of the VOCs are adsorbed from the second portion 132 of the exhaust fluid 128 onto the VOC concentrator rotor 104. This is because that portion of the VOC concentrator rotor 104 is relatively hot, for reasons which will be described further below. Because the VOC concentrator rotor 104 is at an elevated temperature, the portion of the VOC concentrator rotor 104 does not adsorb many VOCs from the second portion 132 of the exhaust fluid 128. While passing through the cooling zone 108, the temperature of the portion of the VOC concentrator rotor 104 passing through the cooling zone 108 gradually cools off. The portion of the VOC concentrator rotor 104 passing from the cooling zone 108 to the adsorption zone 106 is sufficiently cool to adsorb VOCs from the first portion of the exhaust fluid 128 in the adsorption zone 106.

The second portion 132 of the exhaust fluid 128 passes from the cooling zone 108 to the heat exchanger 112. The heat exchanger 112 heats the second portion 132 of the exhaust fluid 128 to a temperature between 190° C. and 230° C. As will be described in more detail below, the heated second portion 132 of the exhaust fluid 128 will enable the VOC concentrator rotor 104 to desorb VOCs into the heated second portion 132 of the exhaust fluid 128. The heat exchanger 112 may heat the second portion 132 of the exhaust 128 to temperatures other than those described above without departing from the scope of the present disclosure.

In one embodiment, the heat exchanger 112 is replaced by a different type of heater. Any suitable heater can be utilized to heat the second portion 132 of the exhaust fluid 128 to a temperature at which the VOC concentrator rotor 104 can desorb VOCs into the second portion 100 exhaust fluid 128.

The second portion 132 of the exhaust fluid 128 passes from the heat exchanger 112 to the desorption zone 110 of the VOC concentrator rotor 104. Because the second portion 132 of the exhaust fluid 128 is at an elevated temperature as described above, the VOC concentrator rotor 104 desorbs VOCs from the VOC concentrator rotor 104 into the second portion 132 of the exhaust fluid 128. The result is that VOCs that were adsorbed from the first portion 130 of the exhaust fluid 128 are desorbed onto the second portion 132 of the exhaust fluid 128.

The rotation of the VOC concentrator rotor 104 enables the continuous removal of VOCs from the exhaust fluid 128 without the need to replace the VOC concentrator rotor 104. After adsorbing VOCs from the first portion 130 of the exhaust fluid 128 at the adsorption zone 106, the rotation of the VOC concentrator rotor 104 causes the VOC laden portion of the VOC rotor 104 to rotate to the desorption zone 110. At the desorption zone 110, the VOC laden portion of the VOC concentrator rotor 104 desorbs VOCs into the second portion 132 of the exhaust fluid 128. The VOC concentrator rotor 104 at the desorption zone 110 is heated by the heated second portion 132 of the exhaust fluid 128. The portion of the VOC concentrator rotor 104 leaving the desorption zone 110 is no longer laden with VOCs because the VOCs have been desorbed onto the second portion 132 of the exhaust fluid 128. The heating portion of the VOC concentrator rotor 104 cools off in the cooling zone 108 and returns to the adsorption zone 106 ready to adsorb more VOCs from the first portion 130 of the exhaust fluid 128. In this way, the VOC concentrator rotor 104 can operate continuously.

In one example, the VOC concentrator rotor 104 rotates with a rotational speed between 2 rotations per hour (rph) and 8 rph. The VOC concentrator rotor 104 can rotate at other speeds than these without departing from the scope of the present disclosure.

The desorption fan 116 takes part in the desorption process. In particular, the desorption fan 116 sucks the heated second portion 132 of the exhaust fluid 128 through the desorption zone 110 of the VOC concentrator rotor 104. Thus, the rotational speed of the desorption fan 116 affects the flow rate of the second portion 132 of the exhaust fluid 128 through the VOC concentrator rotor 104 at the desorption zone 110. Accordingly, the rotational speed of the desorption fan 116 can affect the overall efficiency of the VOC removal system 100, as will be described in further detail below. The desorption fan 116 includes control circuitry that enables the speed of the desorption fan 116 to be adjusted automatically by the control system 126, as will be described in further detail below.

The second portion 132 of the exhaust fluid 128 passes from the desorption fan 116 to the heat exchanger 118. The heat exchanger 118 heats the second portion 132 of the exhaust fluid 128.

The second portion 132 of the exhaust fluid 128 passes from the heat exchanger 118 to the burner 120. The burner 120 removes VOCs from the second portion 132 of the exhaust fluid 128. In particular, the burner 120 generates a high temperature flame. The high temperature flame causes oxidation of the VOCs. The oxidation of the VOCs results in conversion of the VOCs to $H_2O$ and $CO_2$. Accordingly, at the burner 120, dangerous VOCs are converted into harmless compounds. In this way, the burner 120 completes removal of the VOCs from the exhaust fluid 128. VOCs are removed from the first portion 130 of the exhaust fluid 128 at the adsorption zone 106 of the VOC concentrator rotor 104. VOCs are removed from the second portion 132 of the exhaust fluid 128 at the burner 120.

In one embodiment, the burner 120 operates at a temperature between 690° C. and 750° C. The burner 120 can operate at other temperatures without departing from the scope of the present disclosure. The temperature of the burner 120 can have an effect on the overall VOC removal efficiency of the VOC removal system 100. Accordingly, the burner 120 includes control circuitry that enables the temperature of the burner 120 to the controlled in an automated fashion by the control system 126.

The purified second portion 132 of the exhaust fluid 128 is passed to the heat exchanger 118 from the burner 120. The heat exchanger 118 takes heat from the purified second portion 132 to the exhaust fluid 128 and heats The second portion 132 of the exhaust fluid 128 coming from the desorption fan 116. This cools the purified second portion 132 of the exhaust fluid 128, though the purified second portion 132 of the exhaust fluid 128 remains quite hot after passing from the heat exchanger 118.

The purified second portion 132 the exhaust fluid 128 is passed from the heat exchanger 118 to the heat exchanger 112. The heat exchanger 112 takes heat from the purified second portion 132 of the exhaust fluid 128 and heats the second portion 132 of the exhaust fluid 128 coming from the cooling zone 108. Accordingly, the temperature imparted to the second portion 132 of the exhaust fluid 128 at the burner 120 is utilized to heat the second portion 132 of the exhaust fluid 128 in preparation to enter the desorption zone 110. As set forth previously, the heat exchanger 112 can heat the VOC laden second portion 132 to a temperature suitable for desorption of VOCs onto the VOC concentrator rotor 104.

The purified second portion 132 of the exhaust fluid 128 passes from the heat exchanger 112 to the exhaust stack 114. The exhaust stack 114 passes the purified second portion 132 of the exhaust fluid 128 into the atmosphere. In this way, the VOC removal system 100 removes VOCs from the exhaust fluid 128 of the semiconductor process 102.

The VOC removal system 100 includes a VOC sensor 134 and a VOC sensor 136. The VOC sensor 134 monitors the concentration of VOCs in the exhaust fluid 128 prior to removal of any VOCs by the VOC removal system 100. The VOC sensor 136 monitors the concentration of VOCs in the exhaust fluid 128 after removal of VOCs from both the first portion 130 and second portion 132 of the exhaust fluid 128. The VOC sensor 136 may be placed in the exhaust stack 114, outside the exhaust stack 114, or at another location that facilitates measuring the concentration of VOCs in the purified exhaust fluid 128. The VOC sensors 134 and 136 provide VOC concentration signals or data to the control system 126. The control system 126 can calculate an overall VOC removal efficiency based on the VOC concentration signals or data from the VOC sensors 134 and 136.

In one embodiment, the VOC sensors 134 and 136 are compound analyzers. The compound analyzers can detect the presence and concentration of selected compounds in a fluid. Accordingly, the compound analyzers can detect the presence and concentration of VOCs in the exhaust fluid 128. In one embodiment, only a single compound analyzer is present. The single compound analyzer can analyze fluid samples from the exhaust fluid 128 at both the inlet to the VOC removal system 100 and the outlet to the VOC removal system 100.

The temperature sensors 122 and 124 cooperate to measure the temperature of the VOC concentrator rotor 104. The temperature of the VOC concentrator rotor 104 can affect the overall VOC removal efficiency of the VOC removal system 100. The temperature sensors 122 each generate sensor signals indicative of the temperature of the VOC concentrator rotor 104. The temperature signals from the temperature sensors 122 and 124 can be utilized to determine the temperature of the VOC concentrator rotor 104.

In one embodiment, the temperature sensor 122 is placed at the input side of the adsorption zone 106. The temperature sensor 124 is placed at the output side of the adsorption zone 106. There may be a temperature gradient across the VOC concentrator rotor 104. Accordingly, the temperature signals from the temperature sensors 122 and 124 can be utilized to determine a temperature gradient or average temperature of the VOC concentrator rotor 104. The VOC removal system 100 can include additional temperature sensors positioned to sense the temperature of the VOC concentrator rotor 104 at various locations. All the temperature signals can be provided to the control system 126. In one embodiment, a temperature sensor can be positioned to measure the temperature of the second portion 132 of the exhaust fluid 128 between the heat exchanger 112 and the desorption zone 110.

In some cases, components of the VOC removal system 100 may be positioned at locations that can be subject to high temperature fluctuations, air pressure fluctuations, or humidity fluctuations. For example, in some cases, the VOC concentrator rotor 104 may be positioned on a roof of a semiconductor manufacturing facility. In this situation, the time of day, the current weather, and other factors can affect the temperature of the VOC concentrator rotor 104, which in turn can affect the overall VOC removal efficiency of the VOC removal system 100.

The control system 126 receives data related to various parameters of the VOC removal system 100. The control system 126 receives the temperature signals from the temperature sensors 122 and 124. The control system 126 receives the VOC concentration signals from the VOC sensors 134 and 136. The control system 126 receives data indicating the rotational speed of the VOC concentrator rotor 104, the rotational speed of the desorption fan 116, the temperature of the burner 120, and heat transfer parameters of the heat exchangers 112 and 118. Accordingly, the control system 126 is aware of the various current operational parameters of the VOC removal system 100.

In one embodiment, the control system 126 includes a machine learning trained analysis model. The machine learning trained analysis model is trained with a machine learning process to predict the VOC removal efficiency at a future period of time based on current operational parameters of the VOC removal system 100 and to generate recommended operational parameters that can be implemented to improve the VOC removal efficiency.

Figure 2:
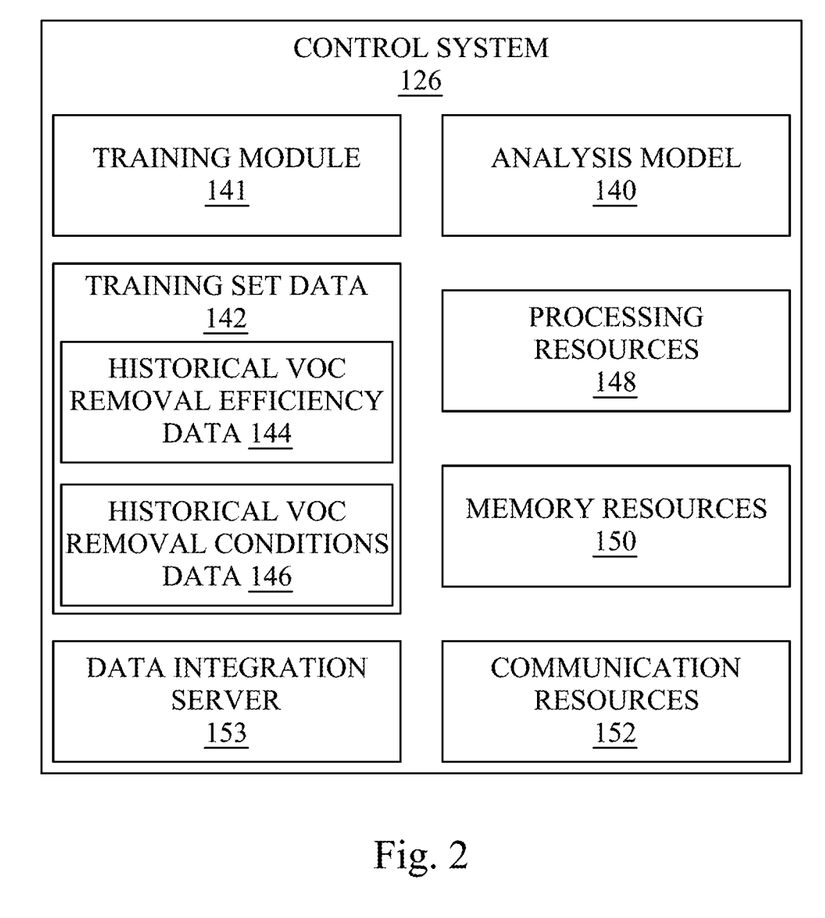
FIG. 2 is a block diagram of a control system of a VOC removal system, according to one embodiment.

FIG. 2 is a block diagram of the control system 126 of FIG. 1, according to one embodiment. The control system 126 is configured to control operation of a VOC removal system 100, according to one embodiment. The control system 126 utilizes machine learning to adjust parameters of the VOC removal system 100. The control system 126 can adjust parameters of the VOC removal system 100 to maintain a high VOC removal efficiency.

In one embodiment, the control system 126 includes an analysis model 140 and a training module 141. The training module 141 trains the analysis model 140 with a machine learning process. The machine learning process trains the analysis model 140 to predict future VOC removal efficiency and to select parameters for a VOC removal process that will result in a high VOC removal efficiency. Although the training module 141 is shown as being separate from the analysis model 140, in practice, the training module 141 may be part of the analysis model 140.

The control system 126 includes, or stores, training set data 142. The training set data 142 includes historical VOC removal efficiency data 144 and historical VOC removal conditions data 146. The historical VOC removal efficiency data 144 includes VOC removal efficiency data for VOC removal processes. The historical VOC removal conditions data 146 includes data related to process conditions or parameters during the VOC removal processes associated with the historical VOC removal efficiency data 144. As will be set forth in more detail below, the training module 141 utilizes the historical VOC removal efficiency data 144 and the historical VOC removal conditions data 146 to train the analysis model 140 with a machine learning process.

In one embodiment, the historical VOC removal efficiency data 144 includes data indicating the efficiency of VOC removal processes. For example, during operation of a semiconductor fabrication facility, thousands or millions of semiconductor wafers may be processed over the course of several months or years. A correspondingly large number of VOC generating semiconductor processes are performed in processing the wafers. VOC removal processes are performed to remove the VOCs from the exhaust fluids generated by the semiconductor processes. The historical VOC removal efficiency data 144 includes the VOC removal efficiency for these VOC removal processes, or for selected time periods during which VOC removal was performed.

In one embodiment, the historical VOC removal conditions data 146 include various process conditions or parameters during the VOC removal processes associated with the historical VOC removal efficiency data 144. Accordingly, for each VOC removal efficiency value in the historical VOC removal efficiency data 144, the historical VOC removal conditions data 146 can include the process conditions or parameters that were present during the period of time associated with that VOC removal efficiency value. The historical VOC removal conditions data 146 can include the rotational speed of the VOC concentrator rotor 104, the temperature of the VOC concentrator rotor 104, the rotational speed of a desorption fan 116, the temperature of a burner 120, the temperature of the VOC concentrator rotor 104 in the adsorption zone 106, the temperature of the VOC concentrator rotor 104 in the desorption zone 110, the inlet VOC concentration of the exhaust fluid 128, the outlet VOC concentration of the exhaust fluid 128, the quantity of exhaust fluid 128, or other parameters of the VOC removal processes.

In one embodiment, the training set data 142 links the historical VOC removal efficiency data 144 with the historical VOC removal conditions data 146. In other words, each VOC removal efficiency value in the historical VOC removal efficiency data 144 is linked to the process conditions data associated with that VOC removal process corresponding to that VOC efficiency removal value. In this way, the historical VOC removal efficiency values are labels for a machine learning process. As will be set forth in more detail below, the labeled training set data 142 can be utilized in a machine learning process to train the analysis model 140 to predict future VOC removal efficiencies and to generate recommended VOC removal parameters to improve the future VOC removal efficiencies.

In one embodiment the analysis model 140 includes a neural network. Training of the analysis model 140 will be described in relation to a neural network. However, other types of analysis models or algorithms can be used without departing from the scope of the present disclosure. The training module 141 utilizes the training set data 142 to train the neural network with a machine learning process. During the training process, the neural network receives, as input, historical VOC removal conditions data 146 from the training set data 142. During the training process, the neural network outputs predicted VOC removal efficiency data. The predicted VOC removal efficiency data predicts VOC removal efficiency that will result from the historical VOC removal conditions data 146. The training process trains the neural network to generate predicted VOC removal efficiency data. The training process also trains the neural network to generate recommended VOC removal parameters to improve VOC removal efficiencies.

In one embodiment, the neural network includes a plurality of neural layers. The various neural layers include neurons that define one or more internal functions. The internal functions are based on weighting values associated with neurons of each neural layer of the neural network.

During training, the control system 126 compares, for each set of historical VOC removal conditions data 146, the predicted VOC removal efficiency data to the actual historical VOC removal efficiency data 144 associated with those process conditions. The control system 126 generates an error function indicating how closely the predicted VOC removal efficiency data matches the historical VOC removal efficiency data 144. The control system 126 then adjusts the internal functions of the neural network. Because the neural network generates predicted VOC removal efficiency data based on the internal functions, adjusting the internal functions will result in the generation of different predicted VOC removal efficiency data for a same set of historical VOC removal conditions data 146. Adjusting the internal functions can result in predicted VOC removal efficiency data that produces larger error functions (worse matching to the historical VOC removal efficiency data 144) or smaller error functions (better matching to the historical VOC removal efficiency data 144).

After adjusting the internal functions of the neural network, the historical VOC removal conditions data 146 is again passed to the neural network and the analysis model 140 again generates predicted VOC removal efficiency data. The training module 141 again compares the predicted VOC removal efficiency data to the historical VOC removal efficiency data 144. The training module 141 again adjusts the internal functions of the neural network. This process is repeated in a very large number of iterations of monitoring the error functions and adjusting the internal functions of the neural network until a set of internal functions is found that results in predicted VOC removal efficiency data that matches the historical VOC removal efficiency data 144 across the entire training set.

At the beginning of the training process, the predicted VOC removal efficiency data likely will not match the historical VOC removal efficiency data 144 very closely. However, as the training process proceeds through many iterations of adjusting the internal functions of the neural network, the errors functions will trend smaller and smaller until a set of internal functions is found that results in predicted VOC removal efficiency data that match the historical VOC removal efficiency data 144. Identification of a set of internal functions that results in predicted VOC removal efficiency data that matches the historical VOC removal efficiency data 144 corresponds to completion of the training process.

In one embodiment, the analysis model 140 includes two neural networks coupled together in an encoder decoder configuration. The encoder neural network is trained with the training process described above to generate predicted VOC removal efficiencies. The decoder network is trained to receive the predicted VOC removal efficiencies and to reproduce the historical VOC removal conditions data 146 that resulted in the predicted VOC removal efficiencies.

The training of the decoder neural network is similar to the training of the encoder neural network. The decoder neural networks includes a plurality of neural layers as described above in relation to the encoder neural network. The decoder neural network receives as input a VOC removal efficiency value and generates as output historical VOC removal conditions. The training process utilizes the historical VOC removal conditions data 146 as labels. For each VOC removal efficiency value, the decoder neural network generates predicted VOC removal conditions. The predicted VOC removal conditions are compared to the historical VOC removal conditions data 146 and an error function is generated. The internal functions of the decoder neural network are adjusted in iterations until the decoder neural network can generate predicted VOC removal conditions data that matches the historical VOC removal conditions data 146 within an error tolerance.

In one embodiment, after the analysis model 140 has been trained, the analysis model 140 can be utilized to generate sets of recommended process conditions that will result in improved VOC removal efficiencies. For example, current VOC removal process conditions or parameters are provided to the encoder neural network of the analysis model 140. The encoder neural network generates a predicted future VOC removal efficiency based on the current VOC removal process conditions or parameters. If the predicted future VOC removal efficiency is lower than a selected threshold, a higher VOC removal efficiency value can be provided to the decoder neural network. The decoder neural network will then generate a set of recommended VOC process removal parameters that will result in the higher VOC removal efficiency. The control system 126 can then adjust the operation of the various components of the VOC removal system 100 to implement the recommended VOC process removal parameters.

In one embodiment, the control system 126 includes processing resources 148, memory resources 150, and communication resources 152. The processing resources 148 can include one or more controllers or processors. The processing resources 148 are configured to execute software instructions, process data, make VOC parameter control decisions, perform signal processing, read data from memory, write data to memory, and to perform other processing operations. The processing resources 148 can include physical processing resources 148 located at a site or facility of the VOC removal system 100. The processing resources can include virtual processing resources 148 remote from the site VOC removal system 100 or a facility at which the VOC removal system 100 is located. The processing resources 148 can include cloud-based processing resources including processors and servers accessed via one or more cloud computing platforms.

In one embodiment, the memory resources 150 can include one or more computer readable memories. The memory resources 150 are configured to store software instructions associated with the function of the control system and its components, including, but not limited to, the analysis model 140. The memory resources 150 can store data associated with the function of the control system 126 and its components. The data can include the training set data 142, current process conditions data, and any other data associated with the operation of the control system 126 or any of its components. The memory resources 150 can include physical memory resources located at the site or facility of the VOC removal system 100. The memory resources can include virtual memory resources located remotely from site or facility of the VOC removal system 100. The memory resources 150 can include cloud-based memory resources accessed via one or more cloud computing platforms.

In one embodiment, the communication resources can include resources that enable the control system 126 to communicate with components associated with the VOC removal system 100. For example, the communication resources 152 can include wired and wireless communication resources that enable the control system 126 to receive the sensor data associated with the VOC removal system 100 and to control equipment of the VOC removal system 100. The communication resources 152 can enable the control system 126 to control the operation of the burner 120, to control the rotational speed of the desorption fan 116, to control the rotational speed of the VOC concentrator rotor 104, or to control other aspects of components of the VOC removal system 100. The communication resources 152 can enable the control system 126 to communicate with remote systems. The communication resources 152 can include, or can facilitate communication via, one or more networks such as wire networks, wireless networks, the Internet, or an intranet. The communication resources 152 can enable components of the control system 126 to communicate with each other.

In one embodiment, the analysis model 140 is implemented via the processing resources 148, the memory resources 150, and the communication resources 152. The control system 126 can be a dispersed control system with components and resources and locations remote from each other and from the VOC removal system 100.

In one embodiment, the control system 126 includes a data integration server 153. The data integration server 153 collects data to be provided to the analysis model 140. For example, the data integration server 153 can gather and store the training set data 142. The data integration server 153 can receive data from one or more controllers implemented in accordance with the processing resources 148 and memory resources 150. The one or more controllers can provide to the data integration server data related to current operating parameters of the VOC removal system 100. The one or more controllers can also provide to the data integration server data related to the inlet VOC concentration, the allied VOC concentration, the current VOC removal efficiency, and the exhaust fluid flow rate. The data integration server 153 can format the data so that the data can be processed by the analysis model 140.

The data integration server 153 can also receive data from the analysis model 140. For example, the data integration server 153 can receive predicted removal efficiencies and recommended parameter adjustments from the analysis model 140. The data integration server 153 can provide this data to one or more controllers configured to control the parameters of the VOC removal system 100. The data integration server 153 can be implemented in accordance with the processing resources 148, the memory resources 150, and the communication resources 152.

Figure 3:
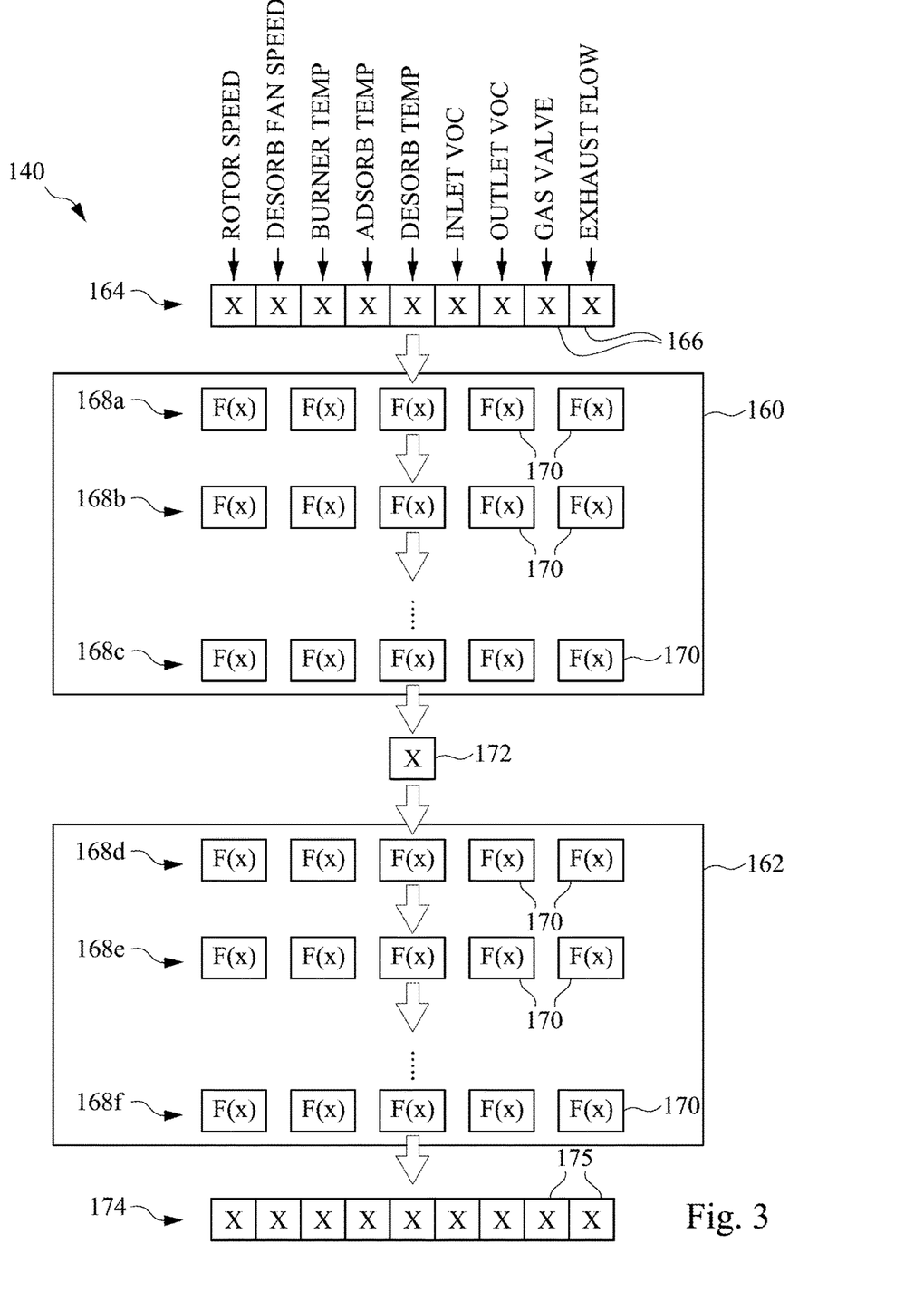
FIG. 3 is a block diagram of an analysis model, according to one embodiment.

FIG. 3 is a block diagram of the analysis model 140 of FIG. 2 illustrating operational aspects and training aspects of analysis model 140, according to one embodiment. The analysis model 140 includes an encoder neural network 160 and a decoder neural network 162, as described in relation to FIG. 2.

As described previously, the training set data 142 includes data related to a plurality of previously performed VOC removal processes. Each previously performed VOC removal process took place with particular process conditions and resulted in a particular VOC removal efficiency. The process conditions for each VOC removal efficiency value are formatted into a respective process conditions vector 164. The process conditions vector 164 includes a plurality of data fields 166. Each data field 166 corresponds to a particular process condition.

The example of FIG. 3 illustrates a single process conditions vector 164 that will be passed to the encoder 160 of the analysis model 140 during the training process. In the example of FIG. 3, the process conditions vector 164 includes nine data fields 166. A first data field 166 corresponds to the rotational speed of the VOC concentrator rotor 104. A second data field 166 corresponds to the rotational speed of the desorption fan 116. A third data field 166 corresponds to the temperature of the burner 120. A fourth data field 166 corresponds to the temperature of the VOC concentrator rotor 104 at the desorption zone 110. A fifth data field 166 corresponds to the temperature of the VOC concentrator rotor 104 at the adsorption zone 106. The sixth data field 166 corresponds to the inlet concentration of VOCs in the exhaust fluid 128. The seventh data field 166 corresponds outlet concentration of VOCs in the exhaust fluid 128. An eighth data field 166 corresponds to how open is gas flow valve of the burner 120. A ninth data field corresponds to the total flow of the exhaust fluid 128. In practice, each process conditions vector 164 can include more or fewer data fields than are shown in FIG. 3 without departing from the scope of the present disclosure. Each process conditions vector 164 can include different types of process conditions without departing from the scope of the present disclosure. The particular process conditions illustrated in FIG. 3 are given only by way of example. Each process condition is represented by a numerical value in the corresponding data field 166.

The encoder 160 includes a plurality of neural layers 168a-c. Each neural layer includes a plurality of nodes 170. Each node 170 can also be called a neuron. Each node 170 from the first neural layer 168a receives the data values for each data field from the process conditions vector 164. Accordingly, in the example of FIG. 3, each node 170 from the first neural layer 168a receives nine data values because the process conditions vector 164 has nine data fields. Each neuron 170 includes a respective internal mathematical function labeled F(x) in FIG. 3. Each node 170 of the first neural layer 168a generates a scalar value by applying the internal mathematical function F(x) to the data values from the data fields 166 of the process conditions vector 164. Further details regarding the internal mathematical functions F(x) are provided below.

In the example of FIG. 3, each neural layer 168a-168e in both the encoder 160 and the decoder 162 are fully connected layers. This means that each neural layer has the same number of nodes as the succeeding neural layer. In the example of FIG. 3, each neural layer 168a-168e includes five nodes. However, the neural layers of the encoder 160 and the decoder 162 can include different numbers of layers than are shown in FIG. 3 without departing from the scope of the present disclosure.

Each node 170 of the second neural layer 168b receives the scalar values generated by each node 170 of the first neural layer 168a. Accordingly, in the example of FIG. 3 each node 170 of the second neural layer 168b receives five scalar values because there are five nodes 170 in the first neural layer 168a. Each node 170 of the second neural layer 168b generates a scalar value by applying the respective internal mathematical function F(x) to the scalar values from the first neural layer 168a.

There may be one or more additional neural layers between the neural layer 168b and the neural layer 168c. The final neural layer 168c of the encoder 160 receives the five scalar values from the five nodes of the previous neural layer (not shown). The output of the final neural layer is the predicted VOC removal efficiency 172.

During the machine learning process, the analysis model 140 compares the predicted VOC removal efficiency data values 172 to the actual removal efficiency values. The analysis model 140 generates an error value indicating the error or difference between the predicted VOC removal efficiency from the data value 172 and the actual removal efficiency. The error value is utilized to train the encoder 160.

The training of the encoder 160 can be more fully understood by discussing the internal mathematical functions F(x). While all of the nodes 170 are labeled with an internal mathematical function F(x), the mathematical function F(x) of each node is unique. In one example, each internal mathematical function has the following form:

$$F(x) = x_1 * w_1 + x_2 * w_2 + \ldots x_n * w_1 + b.$$

In the equation above, each value $x_1$-$x_n$ corresponds to a data value received from a node 170 in the previous neural layer, or, in the case of the first neural layer 168a, each value $x_1$-$x_n$ corresponds to a respective data value from the data fields 166 of the process conditions vector 164. Accordingly, n for a given node is equal to the number of nodes in the previous neural layer. The values $w_1$-$w_n$ are scalar weighting values associated with a corresponding node from the previous layer. The analysis model 140 selects the values of the weighting values $w_1$-$w_n$. The constant b is a scalar biasing value and may also be multiplied by a weighting value. The value generated by a node 170 is based on the weighting values $w_1$-$w_n$. Accordingly, each node 170 has n weighting values $w_1$-$w_n$. Though not shown above, each function F(x) may also include an activation function. The sum set forth in the equation above is multiplied by the activation function. Examples of activation functions can include rectified linear unit (ReLU) functions, sigmoid functions, hyperbolic tension functions, or other types of activation functions. Each function F(x) may also include a transfer function.

After the error value has been calculated, the analysis model 140 adjusts the weighting values $w_1$-$w_n$ for the various nodes 170 of the various neural layers 168a-168c. After the analysis model 140 adjusts the weighting values $w_1$-$w_n$, the analysis model 140 again provides the process conditions vector 164 to the input neural layer 168a. Because the weighting values are different for the various nodes 170 of the analysis model 140, the predicted VOC removal efficiency 172 will be different than in the previous iteration. The analysis model 140 again generates an error value by comparing the actual removal efficiency to the predicted VOC removal efficiency 172.

The analysis model 140 again adjusts the weighting values $w_1$-$w_n$ associated with the various nodes 170. The analysis model 140 again processes the process conditions vector 164 and generates a predicted VOC removal efficiency 172 and associated error value. The training process includes adjusting the weighting values $w_1$-$w_n$ in iterations until the error value is minimized.

FIG. 3 illustrates a single process conditions vector 164 being passed to the encoder 160. In practice, the training process includes passing a large number of process conditions vectors 164 through the analysis model 140, generating a predicted VOC removal efficiency 172 for each process conditions vector 164, and generating an associated error value for each predicted VOC removal efficiency. The training process can also include generating an aggregated error value indicating the average error for all the predicted VOC removal efficiencies for a batch of process conditions vectors 164. The analysis model 140 adjusts the weighting values $w_1$-$w_n$ after processing each batch of process conditions vectors 164. The training process continues until the average error across all process conditions vectors 164 is less than a selected threshold tolerance. When the average error is less than the selected threshold tolerance, the training of the encoder 160 is complete and the analysis model 140 is trained to accurately predict the VOC removal efficiency based on the process conditions.

The decoder 162 operates and is trained in a similar manner as the encoder 160 as described above. During the training process of the decoder 162, the decoder 162 receives a VOC removal efficiency value associated with a process conditions vector 164. The VOC removal efficiency value is received by each node 170 of the first neural layer 168d of the decoder 162. The nodes 170 of the first neural layer 168d apply their respective functions F(x) to the VOC removal efficiency value and pass the resulting scalar values to the nodes 170 of the next neural layer 168e. After the final neural layer 168f processes the scaler values received from the previous neural layer (not shown), the final neural layer 168f outputs a predicted process conditions vector 174. The predicted process conditions vector 174 has the same form as the process conditions vector 164. The data fields 175 of the predicted process conditions vector 174 represent the same parameters or conditions as the data fields 166 of the process conditions vector 164.

The training process compares the predicted process conditions vector 174 to the process conditions vector 164 and determines an error value. The waiting parameters of the functions F(x) of the nodes 170 of the decoder 162 are adjusted and the removal efficiency value is again provided to the decoder 162. The decoder 162 again generates a predicted process conditions vector 174 and an error value is determined. This process is repeated for all of the process conditions vectors 164 in the historical VOC removal conditions data 146 and for all of the historical VOC removal efficiency values from the historical VOC removal efficiency data 144 until the decoder 162 can generate, for each historical VOC removal efficiency value, a predicted process conditions vector 174 that matches the corresponding process conditions vector 164. The training process is complete when a prediction cumulative error value is lower than the threshold error value.

After the encoder 160 and the decoder 162 have been trained as described above, the analysis model 140 is ready to generate recommended VOC removal parameters to improve the VOC removal efficiency of the VOC removal system 100. During operation, the analysis model 140 receives a current process conditions vector representing current conditions or parameters of the VOC removal system 100. The encoder 160 processes the current process conditions vector and generates a predicted future VOC removal efficiency based on the current process conditions vector. If the predicted future VOC removal efficiency is less than a threshold removal efficiency, then the decoder 162 is utilized to generate a set of recommended process conditions that will result in a higher VOC removal efficiency. In particular, the decoder 162 receives an increased removal efficiency data value that is higher than the predicted future removal of efficiency value generated by the encoder 160. The decoder 162 then generates a predicted process conditions vector 174 based on the higher removal efficiency data value.

The predicted process conditions vector 174 includes recommended process conditions values for certain of the process conditions types. For example, the predicted process conditions vector 174 can include a recommended VOC concentrator rotor speed, a recommended desorption fan speed, and a recommended burner temperature. The control system 126 can then control the corresponding components of the VOC removal system 100 to implement the recommended process conditions.

In one embodiment, the control system 126 applies constraints to the recommended process conditions values. For example, the control system 126 can enforce a constraint that any recommended adjustments must fall within the predetermined Delta value of the current value for that parameter. For example, the control system 126 can enforce a constraint that the recommended burner temperature is not different by more than 2° C. than the current burner temperature, that the recommended VOC concentrator rotor speed is not different than the current VOC concentrator rotor speed by more than 1 rph, that the recommended desorption fan speed is not different from the current desorption fan speed by more than 1 Hz, and that the recommended desorption gas temperature is not different from the current desorption gas temperature on more than 2° C. Other maximum deviation values than those described above can be utilized without departing from the scope of the present disclosure.

Furthermore, the control system 126 can enforce constraints on the magnitude of the values of the recommended process parameters. For example, the control system 126 can apply a constraint that the burner temperature should remain between 710° and 730° C., that the desorption gas temperature should be between 190° C. and 210° C., that the desorption fan speed should be between 40 Hz and 50 Hz, and that the concentrator rotor speed should be between 2 rph and 10 rph. Other values than those described above can be utilized without departing from the scope of the present disclosure.

A particular example of a neural network based analysis model 140 has been described in relation to FIG. 3. However, other types of neural network based analysis models, or analysis models of types other than neural networks can be utilized without departing from the scope of the present disclosure. Furthermore, the neural network can have different numbers of neural layers having different numbers of nodes without departing from the scope of the present disclosure.

Figure 4:
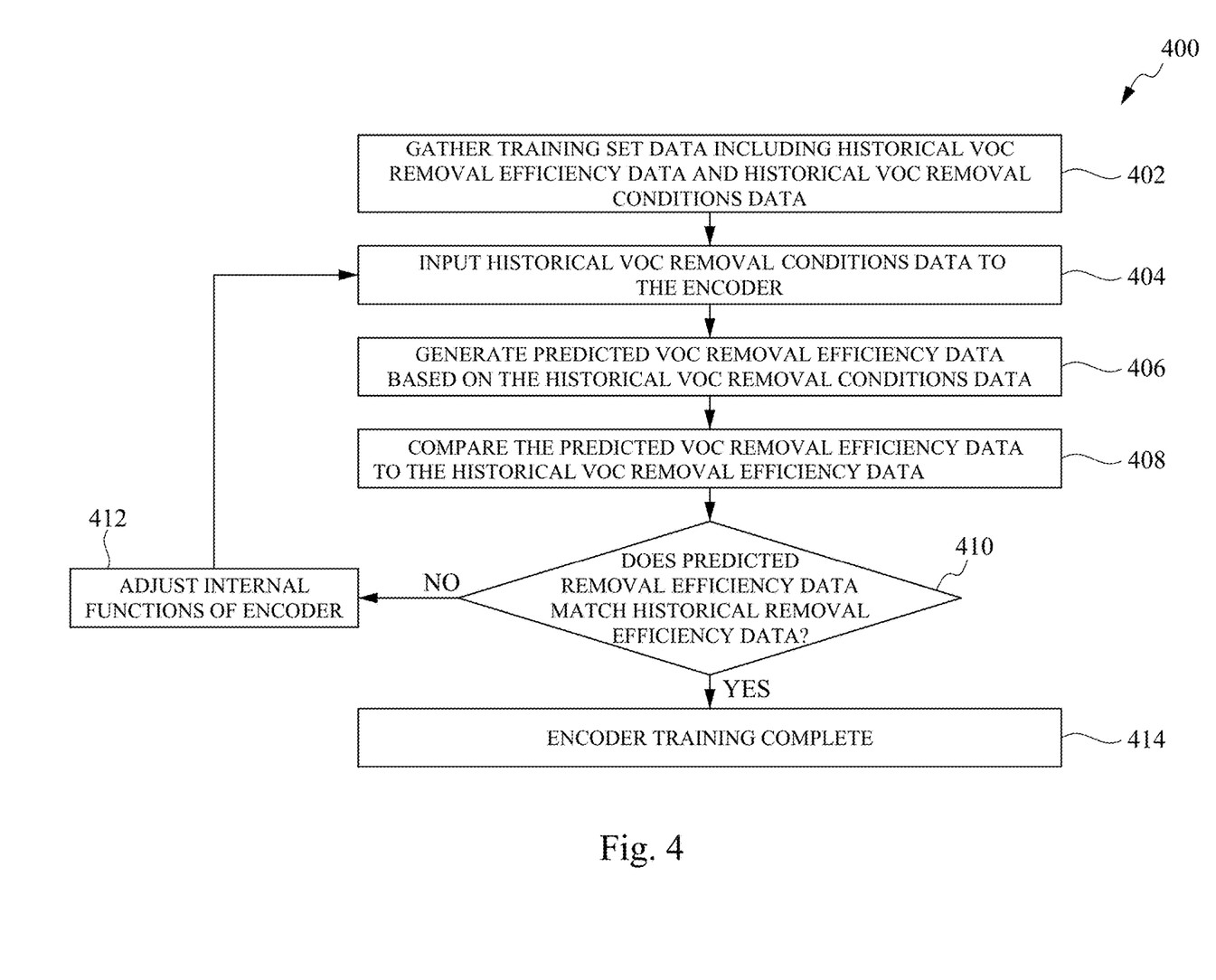
FIG. 4 is a flow diagram of a process for training an encoder of the analysis model with a machine learning process.

FIG. 4 is a flow diagram of a process 400 for training an encoder of an analysis model, such as the analysis model 140 of FIGS. 2 and 3, to accurately predict future VOC removal efficiency, according to one embodiment. The various steps of the process 400 can utilize components, processes, and techniques described in relation to FIGS. 1-3. Accordingly, FIG. 4 is described with reference to FIGS. 1-3.

At step 402, the process 400 gathers training set data 142 including historical VOC removal efficiency data 144 and historical VOC removal conditions data 146. This can be accomplished by using a data mining system or process. The data mining system or process can gather training set data 142 by accessing one or more databases associated with the VOC removal system 100 and collecting and organizing various types of data contained in the one or more databases. The data mining system or process, or another system or process, can process and format the collected data in order to generate a training set data 142. The training set data 142 can include historical VOC removal efficiency data 144 and historical VOC removal conditions data 146 as described in relation to FIG. 2.

At step 404, the process 400 inputs historical VOC removal conditions data 146 to the encoder 160. In one example, this can include inputting historical VOC removal conditions data 146 into the analysis model 140 with the training module 141 as described in relation to FIGS. 2 and 3. The historical VOC removal conditions data 146 can be provided in consecutive discrete sets to the encoder 160. The historical VOC removal conditions data 146 can be provided as vectors to the encoder 160. Each set can include one or more vectors formatted for reception processing by the encoder 160. The historical VOC removal conditions data 146 can be provided to the encoder 160 in other formats without departing from the scope of the present disclosure.

At step 406, the process 400 generates predicted VOC removal efficiency data based on historical VOC removal conditions data 146. In particular, the analysis model 140 generates, for each set of historical VOC removal conditions data 146, predicted VOC removal efficiency data.

At step 408, the predicted VOC removal efficiency data is compared to the historical VOC removal efficiency data 144. In particular, the predicted VOC removal efficiency data for each set of historical VOC removal conditions data 146 is compared to the historical VOC removal efficiency data 144 associated with that set of historical VOC removal conditions data 146. The comparison can result in an error function indicating how closely the predicted VOC removal efficiency data matches the historical VOC removal efficiency data 144. This comparison is performed for each set of predicted VOC removal efficiency data. In one embodiment, this process can include generating an aggregated error function or indication indicating how the totality of the predicted VOC removal efficiency data compares to the historical VOC removal efficiency data 144. These comparisons can be performed by the training module 141 or by the analysis model 140. The comparisons can include other types of functions or data than those described above without departing from the scope of the present disclosure.

At step 410, the process 400 determines whether the predicted VOC removal efficiency data matches the historical VOC removal efficiency data 144 based on the comparisons generated at step 408. In one example, if the aggregate error function is greater than an error tolerance, then the process 400 determines that the predicted VOC removal efficiency data does not match the historical VOC removal efficiency data 144. In one example, if the aggregate error function is less than an error tolerance, then the process 400 determines that the predicted VOC removal efficiency data does match the historical VOC removal efficiency data.

In one embodiment, if the predicted VOC removal efficiency data does not match the historical VOC removal efficiency data 144 at step 410, then the process 400 proceeds to step 412. At step 412, the process 400 adjusts the internal functions associated with the analysis model 140. In one example, the training module 141 adjusts the internal functions associated with the encoder 160. From step 412, the process 400 returns to step 404. At step 404, the historical VOC removal conditions data 146 is again provided to the analysis model 140. Because the internal functions of the encoder 160 have been adjusted, the analysis model 140 will generate different predicted VOC removal efficiency data than in the previous cycle. The process 400 proceeds to steps 406, 408 and 410 and the aggregate error is calculated. If the predicted VOC removal efficiency data does not match the historical VOC removal efficiency data 144, then the process 400 returns to step 412 and the internal functions of the encoder 160 are adjusted again. This process proceeds in iterations until the encoder 160 generates predicted VOC removal efficiency data that matches the historical VOC removal efficiency data 144.

In one embodiment, if the predicted VOC removal efficiency data matches the historical VOC removal efficiency data 144 then process step 410, in the process 400, proceeds to step 414. At step 414 training is complete. The encoder 160 of the analysis model 140 is now ready to be utilized to predict VOC removal efficiency. The process 400 can include other steps or arrangements of steps than shown and described herein without departing from the scope of the present disclosure.

Figure 5:
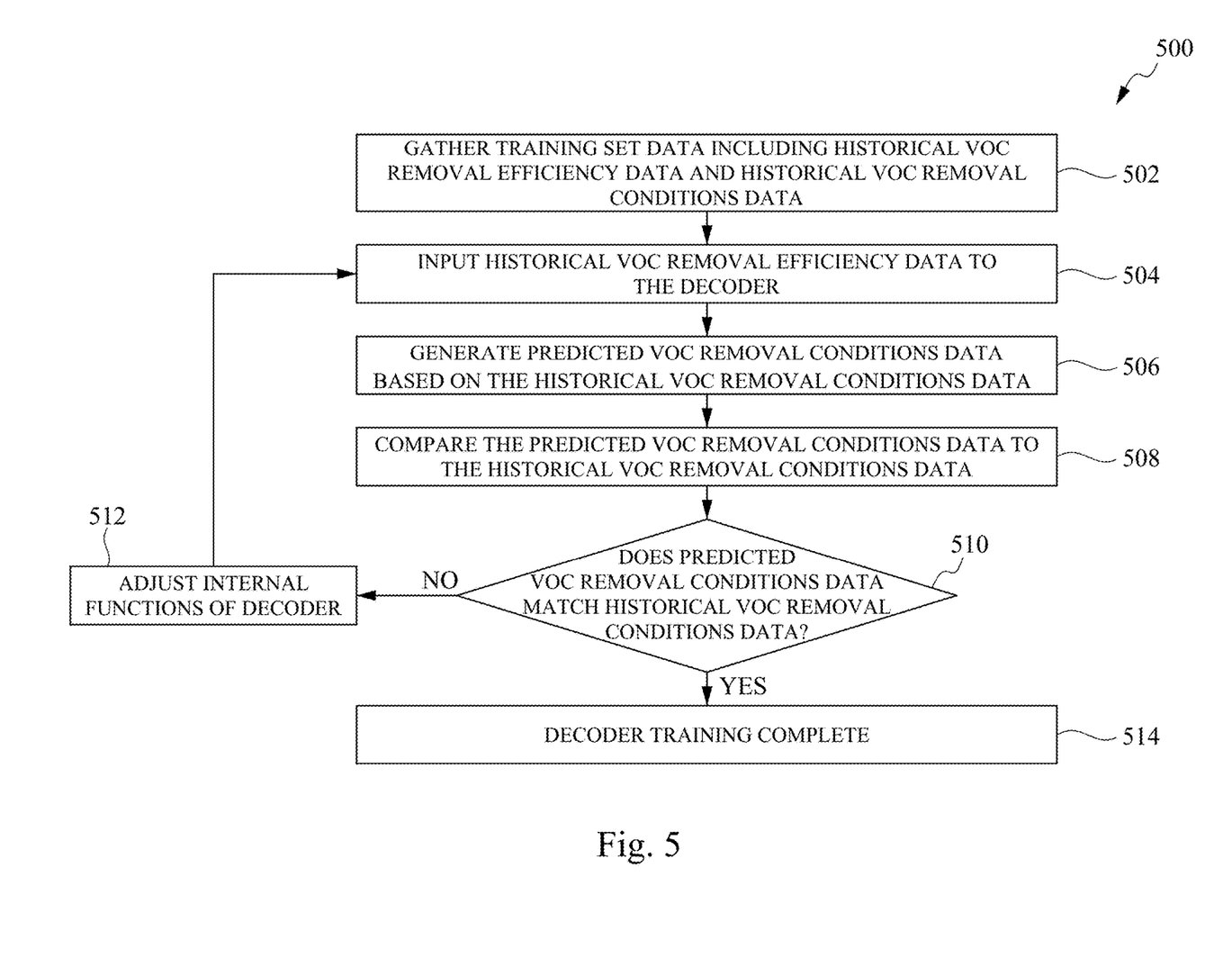
FIG. 5 is a flow diagram of a process for training a decoder of the analysis model with a machine learning process.

FIG. 5 is a flow diagram of a process 500 for training a decoder of an analysis model, to identify process conditions that will result in efficient removal of VOCs from the exhaust fluid 128, according to one embodiment. The various steps of the process 500 can utilize components, processes, and techniques described in relation to FIGS. 1-4. Accordingly, FIG. 5 is described with reference to FIGS. 1-4.

At step 502, the process 500 gathers training set data 142 including historical VOC removal efficiency data 144 and historical VOC removal conditions data 146. This can be accomplished by using a data mining system or process. The data mining system or process can gather training set data 142 by accessing one or more databases associated with the VOC removal system 100 and collecting and organizing various types of data contained in the one or more databases. The data mining system or process, or another system or process, can process and format the collected data in order to generate a training set data 142. The training set data 142 can include historical VOC removal efficiency data 144 and historical VOC removal conditions data 146 as described in relation to FIG. 2.

At step 504, the process 500 inputs historical VOC removal efficiency data 144 to the decoder 162. The historical VOC removal efficiency data 144 can be provided in consecutive discrete values to the decoder 162.

At step 506, the process 500 generates predicted VOC removal conditions data based on historical VOC removal conditions data 146. In particular, the decoder 162 generates, for each historical VOC removal efficiency value, predicted VOC removal conditions data.

At step 508, the predicted VOC removal conditions data is compared to the historical VOC conditions data 146. In particular, the predicted VOC removal conditions data for each historical VOC removal efficiency value is compared to the historical VOC removal conditions data 146 associated with that historical VOC removal efficiency value. The comparison can result in an error function indicating how closely the predicted VOC removal conditions data matches the historical VOC removal conditions data 146. This comparison is performed for each set of predicted VOC removal conditions data. In one embodiment, this process can include generating an aggregated error function or indication indicating how the totality of the predicted VOC removal conditions data compares to the historical VOC removal conditions data 146. These comparisons can be performed by the training module 141 or by the analysis model 140. The comparisons can include other types of functions or data than those described above without departing from the scope of the present disclosure.

At step 510, the process 500 determines whether the predicted VOC removal conditions data matches the historical VOC removal conditions data 146 based on the comparisons generated at step 508. In one example, if the aggregate error function is greater than an error tolerance, then the process 500 determines that the predicted VOC removal conditions data does not match the historical VOC removal conditions data 146. In one example, if the aggregate error function is less than an error tolerance, then the process 500 determines that the predicted VOC removal data does match the historical VOC removal conditions data 146.

In one embodiment, if the predicted VOC removal efficiency data does not match the historical VOC removal efficiency data 144 at step 510, then the process 500 proceeds to step 512. At step 512, the process 500 adjusts the internal functions associated with the analysis model 140. In one example, the training module 141 adjusts the internal functions associated with the decoder 162. From step 512, the process 500 returns to step 504 and proceeds to steps 506, 508 and 510 and the aggregate error is calculated. If the predicted VOC removal conditions data does not match the historical VOC removal conditions data 146, then the process returns to step 512 and the internal functions of the decoder 162 are adjusted again. This process proceeds in iterations until the decoder 162 generates predicted VOC removal conditions data that matches the historical VOC removal conditions data 146.

In one embodiment, if the predicted VOC removal conditions data matches the historical VOC removal conditions data 146 then the process 500 proceeds to step 514. At step 514 training of the decoder 162 is complete. The analysis model 140 is now ready to be utilized to identify process conditions that can be used by the VOC removal system 100. The process 500 can include other steps or arrangements of steps than shown and described herein without departing from the scope of the present disclosure.

Figure 6:
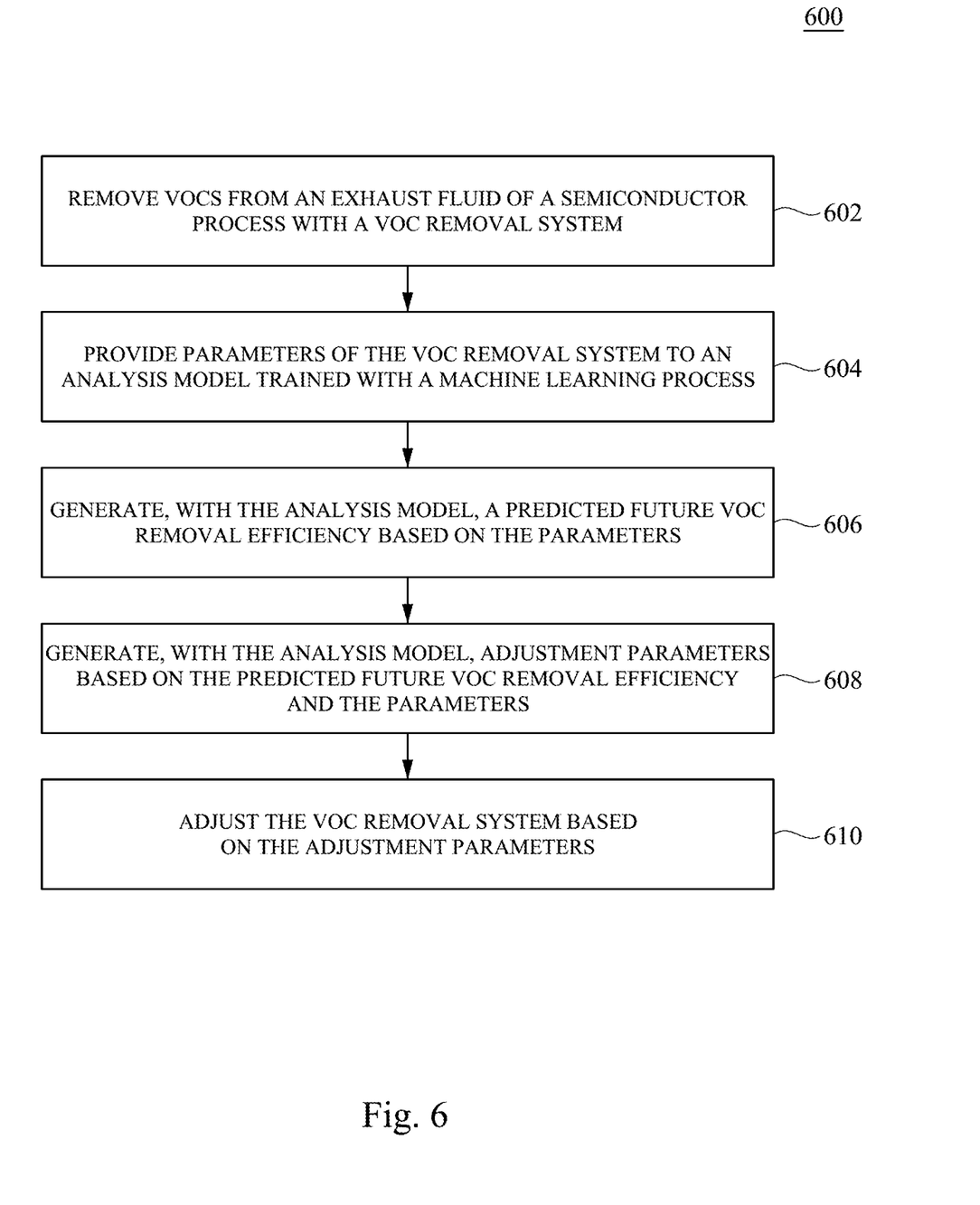
FIG. 6 is a flow diagram of a method for operating a VOC removal system, according to one embodiment.

FIG. 6 is a flow diagram of a method 600 for operating a VOC removal system, according to one embodiment. The various steps of the method 600 can utilize components, processes, and techniques described in relation to FIGS. 1-5. At step 602, the method 600 includes removing VOCs from an exhaust fluid of a semiconductor process with a VOC removal system. One example of a VOC removal system is the VOC removal system of FIG. 1. At step 604, the method 600 includes providing parameters of the VOC removal system to an analysis model trained with a machine learning process. One example of an analysis model is the analysis mode 140 of FIG. 2. At step 606, the method 600 includes generating, with the analysis model, a predicted future VOC removal efficiency based on the parameters. At step 608, the method 600 includes generating, with the analysis model, adjustment parameters based on the predicted future VOC removal efficiency and the parameters. At step 610, the method 600 includes adjusting the VOC removal system based on the adjustment parameters.

Figure 7:
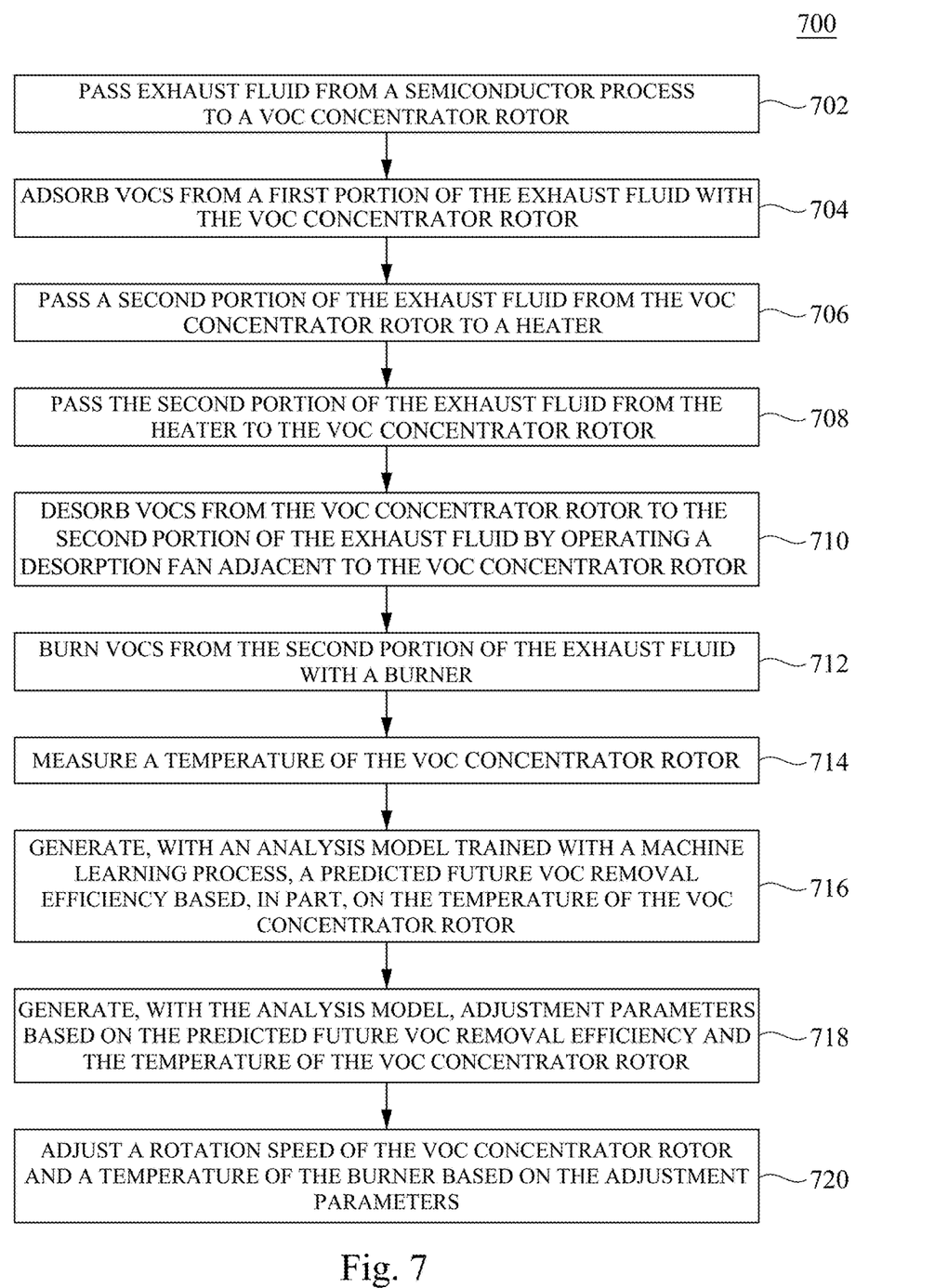
FIG. 7 is a flow diagram of a method for operating a VOC removal system, according to one embodiment.

FIG. 7 is flow diagram of a method 700 for operating a VOC removal system, according to one embodiment. The various steps of the method 700 can utilize components, processes, and techniques described in relation to FIGS. 1-6. At step 702, the method 700 includes passing exhaust fluid from a semiconductor process to a VOC concentrator rotor. One example of a semiconductor process is the semiconductor process 102 of FIG. 1. One example of a VOC concentrator rotor is the VOC concentrator rotor 104 of FIG. 1. At step 704, the method 700 includes adsorbing VOCs from a first portion of the exhaust fluid with the VOC concentrator rotor. At step 706, the method 700 includes passing a second portion of the exhaust fluid from the VOC concentrator rotor to a heater. At step 708, the method 700 includes passing the second portion of the exhaust fluid from the heater to the VOC concentrator rotor. One example of a heater is the heat exchanger 112 of FIG. 1. At step 710, the method 700 includes desorbing VOCs from the VOC concentrator rotor to the second portion of the exhaust fluid by operating a desorption fan adjacent to the VOC concentrator rotor. One example of a desorption fan is the desorption fan 116 of FIG. 1. At step 712, the method 700 includes burning VOCs from the second portion of the exhaust fluid with a burner. One example of a burner is the burner 120 of FIG. 1. At step 714, the method 700 includes measuring a temperature of the VOC concentrator rotor. At step 716, the method 700 includes generating, with an analysis model trained with a machine learning process, a predicted future VOC removal efficiency based, in part, on the temperature of the VOC concentrator rotor. One example of an analysis model is the analysis model 140 of FIG. 2. At step 718, the method 700 includes generating, with the analysis model, adjustment parameters based on the predicted future VOC removal efficiency and the temperature of the VOC concentrator rotor. At step 720, the method 700 includes adjusting a rotation speed of the VOC concentrator rotor and a temperature of the burner based on the adjustment parameters.

In one embodiment, the method includes removing VOCs from an exhaust fluid of a semiconductor process with a VOC removal system and providing parameters of the VOC removal system to an analysis model trained with a machine learning process. The method include generating, with the analysis model, a predicted future VOC removal efficiency based on the parameters, generating, with the analysis model, adjustment parameters based on the predicted future VOC removal efficiency and the parameters and adjusting the VOC removal system based on the adjustment parameters.

In one embodiment, a VOC removal system includes a VOC concentrator rotor configured to adsorb VOCs from a first portion of an exhaust fluid from a semiconductor process and to desorb VOCs to a second portion of the exhaust fluid. The system includes a desorption fan configured to drive the second portion of the exhaust fluid through a desorption zone of the VOC concentrator rotor and a burner configured to burn VOCs from the second portion of the exhaust fluid. The system includes a control system including an analysis model trained with a machine learning process and configured to analyze parameters of the VOC concentrator rotor, the desorption fan, and the burner and configured to generate a predicted future VOC removal efficiency based on the parameters and to generate adjustment parameters based on the parameters and the predicted future VOC removal efficiency. The control system is configured to adjust operation of the VOC concentrator rotor, the desorption fan, and the burner based on the adjustment parameters.

In one embodiment, a method includes passing exhaust fluid from a semiconductor process to a VOC concentrator rotor, adsorbing VOCs from a first portion of the exhaust fluid with the VOC concentrator rotor, and passing a second portion of the exhaust fluid from the VOC concentrator rotor to a heater. The method includes passing the second portion of the exhaust fluid from the heater to the VOC rotor, desorbing VOCs from the VOC concentrator rotor to the second portion of the exhaust fluid by operating a desorption fan adjacent to the VOC concentrator rotor, and burning VOCs from the second portion of the exhaust fluid with a burner. The method includes measuring a temperature of the VOC concentrator rotor and generating, with an analysis model trained with a machine learning process, a predicted future VOC removal efficiency based, in part, on the temperature of the VOC concentrator rotor. The method includes generating, with the analysis model, adjustment parameters based on the predicted future VOC removal efficiency and the temperature of the VOC concentrator rotor and adjusting a rotation speed of the VOC concentrator rotor and a temperature of the burner based on the adjustment parameters.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    removing volatile organic compounds (VOCs) from an exhaust fluid of a semiconductor process with a VOC removal system by:
        adsorbing, with a VOC concentrator rotor, VOCs from a first portion of the exhaust fluid from the semiconductor process;
        driving, with a desorption fan, a second portion of the exhaust fluid through a desorption zone of the VOC concentrator rotor;
        desorbing, with the VOC concentrator rotor, VOCs to the second portion of the exhaust fluid; and
        removing VOCs from the second portion of the exhaust fluid downstream from the VOC concentrator rotor;
    providing parameters of the VOC removal system to an analysis model trained with a machine learning process;
    generating, with the analysis model, a predicted future VOC removal efficiency based on the parameters;
    generating, with the analysis model, adjustment parameters based on the predicted future VOC removal efficiency and the parameters; and
    adjusting the VOC removal system based on the adjustment parameters.

2. The method of claim 1, wherein generating the adjustment parameters includes identifying, with the analysis model, changes to the VOC system predicted to result in improved VOC removal efficiency.

3. The method of claim 2, wherein the parameters include a current VOC removal efficiency of the VOC system.

4. The method of claim 3, wherein the parameters include a temperature and rotational speed of the VOC concentrator rotor.

5. The method of claim 3, wherein the parameters include a temperature of a VOC burner.

6. The method of claim 3, wherein the parameters include a temperature and speed of the desorption fan.

7. The method of claim 3, wherein the adjustment parameters include a recommended rotational speed of the VOC concentrator rotor.

8. The method of claim 3, wherein the adjustment parameters include a recommended rotational speed of the desorption fan.

9. The method of claim 3, wherein the adjustment parameters include a recommended temperature of a VOC burner.

10. The method of claim 3, wherein the adjustment parameters include a recommended desorption temperature.

11. A method, comprising:
    passing exhaust fluid from a semiconductor process to a volatile organic compounds (VOC) concentrator rotor;
    adsorbing VOCs from a first portion of the exhaust fluid with the VOC rotor;
    passing a second portion of the exhaust fluid from the VOC rotor to a heater;
    passing the second portion of the exhaust fluid from the heater to the VOC rotor;

desorbing VOCs from the VOC rotor to the second portion of the exhaust fluid by operating a desorption fan adjacent to the VOC rotor;

burning VOCs from the second portion of the exhaust fluid with a burner;

measuring a temperature of the VOC rotor;

generating, with an analysis model trained with a machine learning process, a predicted future VOC removal efficiency based, in part, on the temperature of the VOC concentrator rotor;

generating, with the analysis model, adjustment parameters based on the predicted future VOC removal efficiency and the temperature of the VOC concentrator rotor; and adjusting a rotation speed of the VOC concentrator rotor and a temperature of the burner based on the adjustment parameters.

12. The method of claim 11, further comprising adjusting a rotational speed of the desorption fan based on the adjustment parameters.

13. The method of claim 11, further comprising measuring a current VOC removal efficiency and generating the adjustment parameters based on the current VOC removal efficiency.

14. A method, comprising:

adsorbing, with a volatile organic compound (VOC) concentrator rotor, VOCs from a first portion of an exhaust fluid from a semiconductor process;

driving, with a desorption fan, a second portion of the exhaust fluid through a desorption zone of the VOC concentrator rotor;

desorbing, with the VOC concentrator rotor, VOCs to the second portion of the exhaust fluid;

burning, with a burner, VOCs from the second portion of the exhaust fluid;

generating a predicted future VOC removal efficiency by analyzing, with an analysis model of a control system, parameters of the VOC concentrator rotor, the desorption fan, and the burner;

generating, with the analysis model, adjustment parameters based on the parameters and the predicted future VOC removal efficiency; and adjusting, with the control system, operation of the VOC concentrator rotor, the desorption fan, and the burner based on the adjustment parameters.

15. The method of claim 14, wherein the analysis model includes:

an encoder configured to generate the predicted future VOC removal efficiency; and a decoder configured to generate the adjustment parameters.

16. The method of claim 15, further comprising sensing, with a first temperature sensor positioned adjacent to the VOC concentrator rotor, a temperature of the VOC concentrator rotor, wherein the parameters include the temperature of the VOC concentrator rotor.

17. The method of claim 16, wherein the control system includes a second temperature sensor positioned adjacent to an upstream side of the VOC concentrator rotor, wherein the first temperature sensor is positioned adjacent to a downstream side of the VOC concentrator rotor, wherein the parameters include temperatures sensed by both the first and second temperature sensors.

18. The method of claim 16, further comprising:

receiving, with a heat exchanger, heat from the second portion of the exhaust fluid downstream from the burner; and providing, with the heat exchanger, heat to the second portion of the exhaust fluid upstream from the desorption zone of the VOC concentrator rotor.

19. The method of claim 16, further comprising sensing, with a VOC sensor, inlet VOCs in the exhaust fluid upstream from the VOC concentrator rotor.

20. The method of claim 16, further comprising sensing, with a VOC sensor, outlet VOCs exiting an exhaust stack downstream from the VOC concentrator rotor.

* * * * *